United States Patent
Stelung et al.

(10) Patent No.: US 8,698,747 B1
(45) Date of Patent: Apr. 15, 2014

(54) HAND-ACTIVATED CONTROLLER

(75) Inventors: Daniel Stelung, Irvine, CA (US); Carl Kamph, Venice, CA (US)

(73) Assignee: Mattel, Inc., El Segundo, CA (US)

( * ) Notice: Subject to any disclaimer, the term of this patent is extended or adjusted under 35 U.S.C. 154(b) by 549 days.

(21) Appl. No.: 12/903,134

(22) Filed: Oct. 12, 2010

Related U.S. Application Data (60) Provisional application No. 61/250,831, filed on Oct. 12, 2009.

(51) Int. Cl.
  *G06F 3/033* (2013.01)
  *G06F 3/038* (2013.01)
  *G05G 9/047* (2006.01)

(52) U.S. Cl.
  CPC .......... *G06F 3/038* (2013.01); *G05G 9/04792* (2013.01)
  USPC ........................................... 345/161

(58) Field of Classification Search
  USPC .............. 345/156–161; 463/38; 700/185
  See application file for complete search history.

(56) References Cited

U.S. PATENT DOCUMENTS

| | | | |
|---|---|---|---|
| 3,728,480 A | 4/1973 | Baer | |
| 3,771,037 A | 11/1973 | Bailey, Jr. | |
| 3,778,058 A | 12/1973 | Rausch | |
| 3,814,871 A * | 6/1974 | Osika | 200/6 A |
| 3,829,095 A | 8/1974 | Baer | |
| 3,905,045 A | 9/1975 | Nickel | |
| 4,230,916 A * | 10/1980 | Mochizuki | 200/6 A |
| 4,469,330 A | 9/1984 | Asher | |
| 4,588,187 A | 5/1986 | Dell | |
| 4,602,286 A | 7/1986 | Kellar et al. | |
| 4,631,750 A | 12/1986 | Gabriel et al. | |
| 4,833,625 A | 5/1989 | Fisher et al. | |
| 4,849,583 A | 7/1989 | Meyer | |
| 4,892,312 A | 1/1990 | Minemoto et al. | |
| 4,908,874 A | 3/1990 | Gabriel | |
| 4,910,503 A * | 3/1990 | Brodsky | 345/161 |
| 4,976,429 A | 12/1990 | Nagel | |
| 5,043,709 A * | 8/1991 | Kim | 345/161 |
| 5,140,313 A * | 8/1992 | Wen | 345/161 |
| 5,175,808 A | 12/1992 | Sayre | |
| 5,442,378 A | 8/1995 | Yasuhara et al. | |
| 5,469,536 A | 11/1995 | Blank | |
| 5,551,701 A * | 9/1996 | Bouton et al. | 463/36 |

(Continued)

FOREIGN PATENT DOCUMENTS

| | | |
|---|---|---|
| DE | 19752054 A1 | 5/1999 |
| EP | 1460523 A2 | 9/2004 |

(Continued)

*Primary Examiner* — Dorothy Harris
(74) *Attorney, Agent, or Firm* — Cantor Colburn LLP (57) ABSTRACT

A hand-activated controller including a base and a circuit board attached to the base is provided. The circuit board has an aperture extending therethrough, and first, second, third, and fourth switches disposed thereon proximate to the aperture. The controller further includes a shaft having a tubular portion and a plate portion. The plate portion is disposed proximate to the first, second, third and fourth switches. The controller further includes a ball-shaped member that is coupled to the tubular portion of the shaft, and a microprocessor. The microprocessor determines if the first, second, third and fourth switches transition from a first operational state to a second operational state indicating that the ball-shaped member and the shaft have been pushed downwardly toward the base, and to generate a first command signal in response thereto.

19 Claims, 4 Drawing Sheets

(56) References Cited

U.S. PATENT DOCUMENTS

| | | | |
|---|---|---|---|
| 5,589,828 A | 12/1996 | Armstrong | |
| 5,591,082 A | 1/1997 | Jensen et al. | |
| 5,675,359 A * | 10/1997 | Anderson | 345/161 |
| 5,685,776 A | 11/1997 | Stambolic et al. | |
| 5,696,850 A | 12/1997 | Parulski et al. | |
| 5,731,819 A | 3/1998 | Gagne et al. | |
| 5,738,352 A | 4/1998 | Ohkubo et al. | |
| 5,748,326 A | 5/1998 | Thompson-Bell et al. | |
| 5,764,164 A | 6/1998 | Cartabiano et al. | |
| 5,781,198 A | 7/1998 | Korn | |
| 5,785,317 A | 7/1998 | Sasaki | |
| 5,841,428 A * | 11/1998 | Jaeger et al. | 345/184 |
| 5,844,565 A | 12/1998 | Mizutani et al. | |
| 5,854,634 A | 12/1998 | Kroitor | |
| 5,893,798 A | 4/1999 | Stambolic et al. | |
| 5,914,748 A | 6/1999 | Parulski et al. | |
| 5,936,613 A | 8/1999 | Jaeger et al. | |
| 5,959,863 A | 9/1999 | Hoyt et al. | |
| 5,974,198 A | 10/1999 | Hamburg et al. | |
| 5,990,901 A | 11/1999 | Lawton et al. | |
| 5,995,104 A | 11/1999 | Kataoka et al. | |
| 6,017,273 A * | 1/2000 | Pelkey | 463/36 |
| 6,059,660 A | 5/2000 | Takada et al. | |
| 6,084,598 A | 7/2000 | Chekerylla | |
| 6,097,853 A | 8/2000 | Gu et al. | |
| 6,115,485 A | 9/2000 | Dumoulin et al. | |
| 6,132,313 A | 10/2000 | Yamaguchi | |
| 6,139,432 A * | 10/2000 | Watanabe et al. | 463/31 |
| 6,147,692 A | 11/2000 | Shaw et al. | |
| 6,160,540 A | 12/2000 | Fishkin et al. | |
| 6,219,444 B1 | 4/2001 | Shashua et al. | |
| 6,248,017 B1 | 6/2001 | Roach | |
| 6,266,453 B1 | 7/2001 | Hibbard et al. | |
| 6,268,846 B1 | 7/2001 | Georgiev | |
| 6,285,381 B1 | 9/2001 | Sawano et al. | |
| 6,285,794 B1 | 9/2001 | Georgiev et al. | |
| 6,307,561 B1 | 10/2001 | Doi et al. | |
| 6,320,583 B1 | 11/2001 | Shaw et al. | |
| 6,322,449 B1 | 11/2001 | Klitsner et al. | |
| 6,325,719 B1 | 12/2001 | Fukawa et al. | |
| 6,337,692 B1 | 1/2002 | Rai et al. | |
| 6,351,269 B1 | 2/2002 | Georgiev | |
| 6,362,810 B1 * | 3/2002 | Matsuda | 345/161 |
| 6,400,828 B2 | 6/2002 | Covell et al. | |
| 6,417,663 B1 | 7/2002 | Piernot et al. | |
| 6,428,416 B1 | 8/2002 | Ogata | |
| 6,435,969 B1 | 8/2002 | Tanaka et al. | |
| 6,540,615 B2 | 4/2003 | Tanaka et al. | |
| 6,549,191 B2 | 4/2003 | Leman | |
| 6,571,020 B1 | 5/2003 | Dumoulin et al. | |
| 6,573,889 B1 | 6/2003 | Georgiev | |
| 6,589,118 B1 * | 7/2003 | Soma et al. | 463/38 |
| 6,597,368 B1 | 7/2003 | Arai et al. | |
| 6,614,420 B1 | 9/2003 | Han et al. | |
| 6,664,946 B1 | 12/2003 | Stipes et al. | |
| 6,693,646 B1 | 2/2004 | Jones | |
| 6,734,851 B2 | 5/2004 | Georgiev | |
| 6,786,823 B2 | 9/2004 | Huang et al. | |
| 6,805,020 B2 | 10/2004 | Onodera | |
| 6,850,249 B1 | 2/2005 | Gu | |
| 6,873,327 B1 | 3/2005 | Edwards et al. | |
| 6,888,533 B1 | 5/2005 | Oguro | |
| 6,892,597 B2 | 5/2005 | Tews | |
| 6,911,980 B1 | 6/2005 | Newell et al. | |
| 6,919,888 B1 | 7/2005 | Perani et al. | |
| 6,922,201 B2 | 7/2005 | Blish et al. | |
| 6,963,350 B1 | 11/2005 | Perani et al. | |
| 6,967,658 B2 | 11/2005 | Hunter et al. | |
| 7,023,454 B1 | 4/2006 | Knight | |
| 7,034,832 B2 | 4/2006 | Yamauchi et al. | |
| 7,034,833 B2 | 4/2006 | Epshteyn | |
| 7,042,472 B2 | 5/2006 | Sapp | |
| 7,050,095 B2 | 5/2006 | Dotsubo et al. | |
| 7,077,750 B1 | 7/2006 | Nakamura | |
| 7,079,706 B2 | 7/2006 | Peterson | |
| 7,084,884 B1 | 8/2006 | Nelson et al. | |
| 7,098,932 B2 | 8/2006 | Georgiev et al. | |
| 7,113,633 B2 | 9/2006 | Petrich | |
| 7,113,836 B2 | 9/2006 | Hornig | |
| 7,154,510 B2 | 12/2006 | Simon et al. | |
| 7,154,512 B2 | 12/2006 | Greggain | |
| 7,182,691 B1 | 2/2007 | Schena | |
| 7,199,793 B2 | 4/2007 | Oh et al. | |
| 7,201,482 B2 | 4/2007 | Tamura | |
| 7,209,119 B2 | 4/2007 | Oguro | |
| 7,209,120 B2 | 4/2007 | Oguro | |
| 7,209,121 B2 | 4/2007 | Oguro | |
| 7,209,122 B2 | 4/2007 | Oguro | |
| 7,212,188 B2 | 5/2007 | Oguro | |
| 7,233,313 B2 | 6/2007 | Levin et al. | |
| 7,256,787 B2 | 8/2007 | Hung et al. | |
| 7,277,083 B2 | 10/2007 | Duncan | |
| 7,278,117 B2 | 10/2007 | Gargi | |
| 7,302,113 B2 | 11/2007 | Pilu et al. | |
| 7,312,805 B1 | 12/2007 | Worthington | |
| 7,345,670 B2 | 3/2008 | Armstrong | |
| 7,397,932 B2 | 7/2008 | McAlpine et al. | |
| 7,407,439 B1 * | 8/2008 | Ochoa | 463/37 |
| 7,411,595 B2 | 8/2008 | Georgiev | |
| 7,418,156 B1 | 8/2008 | Candela et al. | |
| 7,420,574 B2 | 9/2008 | Santos | |
| 7,425,958 B2 | 9/2008 | Berger et al. | |
| 7,429,974 B2 | 9/2008 | Salazar-Ferrer et al. | |
| 7,436,400 B2 | 10/2008 | Cheng | |
| 7,483,553 B2 | 1/2009 | Xu et al. | |
| 7,489,309 B2 | 2/2009 | Levin et al. | |
| 7,518,745 B2 | 4/2009 | Guerraz et al. | |
| 2002/0119820 A1 | 8/2002 | Tsutsui | |
| 2002/0142838 A1 | 10/2002 | Russell | |
| 2003/0058258 A1 | 3/2003 | Simpson et al. | |
| 2003/0206183 A1 | 11/2003 | Silverstein | |
| 2004/0056871 A1 | 3/2004 | Milliron | |
| 2004/0109010 A1 | 6/2004 | Blish et al. | |
| 2005/0026685 A1 | 2/2005 | Ruark et al. | |
| 2005/0073528 A1 | 4/2005 | Gu | |
| 2005/0073529 A1 | 4/2005 | Gu | |
| 2005/0215321 A1 | 9/2005 | Hussaini et al. | |
| 2005/0277470 A1 | 12/2005 | Watanachote | |
| 2005/0286799 A1 | 12/2005 | Huang et al. | |
| 2006/0001682 A1 | 1/2006 | Honda | |
| 2006/0097453 A1 * | 5/2006 | Feldman et al. | 273/304 |
| 2006/0148564 A1 | 7/2006 | Herkelman | |
| 2006/0170669 A1 | 8/2006 | Walker et al. | |
| 2006/0268015 A1 | 11/2006 | Georgiev et al. | |
| 2006/0281550 A1 | 12/2006 | Schena | |
| 2007/0008322 A1 | 1/2007 | Ludwigsen | |
| 2007/0057971 A1 | 3/2007 | Bychkov et al. | |
| 2007/0147820 A1 | 6/2007 | Steinberg et al. | |
| 2007/0171237 A1 | 7/2007 | Pinter | |
| 2008/0001919 A1 | 1/2008 | Pascucci | |
| 2008/0088603 A1 | 4/2008 | Eliasson et al. | |
| 2008/0165195 A1 | 7/2008 | Rosenberg | |
| 2008/0246777 A1 | 10/2008 | Swanson et al. | |
| 2008/0291216 A1 | 11/2008 | Cheng et al. | |
| 2008/0311991 A1 | 12/2008 | Goto et al. | |
| 2009/0066700 A1 | 3/2009 | Harding et al. | |
| 2009/0262472 A1 * | 10/2009 | Weeks et al. | 361/42 |

FOREIGN PATENT DOCUMENTS

| | | |
|---|---|---|
| FR | 2718862 A1 | 10/1995 |
| JP | 7182497 A | 7/1995 |
| JP | 7182501 A | 7/1995 |
| JP | 7200800 A | 8/1995 |
| JP | 7200802 A | 8/1995 |
| JP | 898954 A | 4/1996 |
| JP | 9218744 A | 8/1997 |
| JP | 1021290 A | 1/1998 |
| JP | 2000342845 A | 12/2000 |
| JP | 20015603 A | 1/2001 |
| JP | 2002329192 A | 11/2002 |
| JP | 2003117236 A | 4/2003 |
| JP | 2003298837 A | 10/2003 |
| JP | 2004064309 A | 2/2004 |

(56) References Cited

FOREIGN PATENT DOCUMENTS

| | | |
|---|---|---|
| JP | 2004363772 A | 12/2004 |
| JP | 2005197792 A | 7/2005 |
| JP | 2005216131 A | 8/2005 |
| JP | 200684324 A | 3/2006 |
| JP | 200872390 A | 3/2008 |
| JP | 2008123086 A | 5/2008 |
| JP | 2008236141 A | 10/2008 |
| JP | 2008242806 A | 10/2008 |

* cited by examiner

HAND-ACTIVATED CONTROLLER

CROSS REFERENCE TO RELATED APPLICATIONS

This application claims the benefit of U.S. provisional patent application Ser. No. 61/250,831 filed on Oct. 12, 2009 the contents of which are incorporated herein by reference thereto.

BACKGROUND

Computer game systems have utilized joysticks to allow a user to control computer games executing on the computer game systems. However, other joysticks only allow a few degrees of movement by a users hand to control a computer game.

Accordingly, the inventors herein have recognized that it would be desirable for an improved hand-activated controller.

SUMMARY OF THE INVENTION

A hand-activated controller in accordance with exemplary embodiment is provided. The hand-activated controller includes a base and a circuit board attached to the base. The circuit board has an aperture extending therethrough, and first, second, third, and fourth switches disposed on the circuit board proximate to the aperture. The hand-activated controller further includes a shaft having a tubular portion and a plate portion coupled to the tubular portion. The plate portion is disposed proximate to the first, second, third and fourth switches. The hand-activated controller further includes a spring being disposed between the plate portion of the shaft and the base. The spring extends through the aperture of the circuit board. The hand-activated controller further includes a ball-shaped member that is coupled to the tubular portion of the shaft. The hand-activated controller further includes a microprocessor electrically coupled to the first, second, third and fourth switches. The microprocessor is configured to determine if the first, second, third and fourth switches transition from a first operational state to a second operational state indicating that the ball-shaped member and the shaft have been pushed downwardly toward the base, and to generate a first command signal in response thereto.

BRIEF DESCRIPTION OF THE DRAWINGS

Other features, advantages and details appear, by way of example only, in the following description of embodiments, the description referring to the drawings in which.

DETAILED DESCRIPTION

Referring now to the Figures a hand activated controller 10 is disclosed. Referring now to FIGS. 1-5, a hand-activated controller 10 for initiating controlling software functions of a computer game is illustrated. The hand-activated controller 10 includes a base 20, a circuit board 22, switches 24, 26, 28, 30, 32, 34, 36, a plate 40, a shaft 42, springs 44, 46, a lever 47, a ball-shaped member 48, a support member 50, a cap portion 52, an electrical contact 60, an electrical contact 70, a support member 72, function selection switches 74, 76, 78, 80, 82, a microprocessor 84, a read-only memory (ROM), a random access memory (RAM), an input-output (I/O) interface, an upper housing portion 92, and a pad 94.

Figure 4:
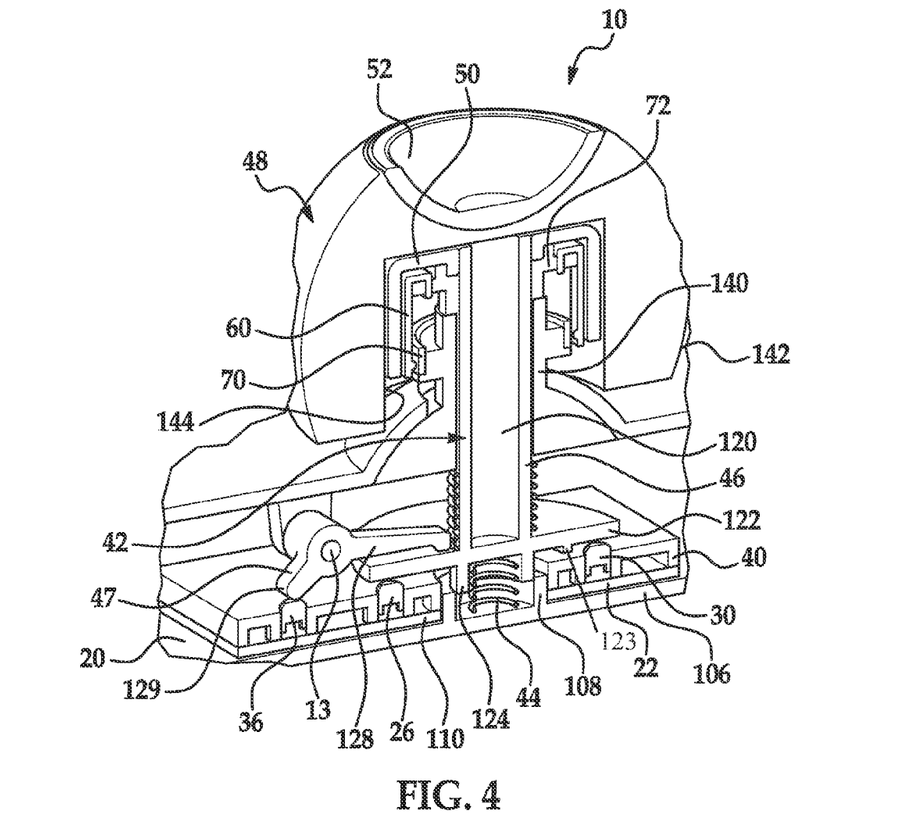
FIG. 4 is an enlarged cross-sectional schematic of the hand-activated controller of FIG. 1.
Figure 5:
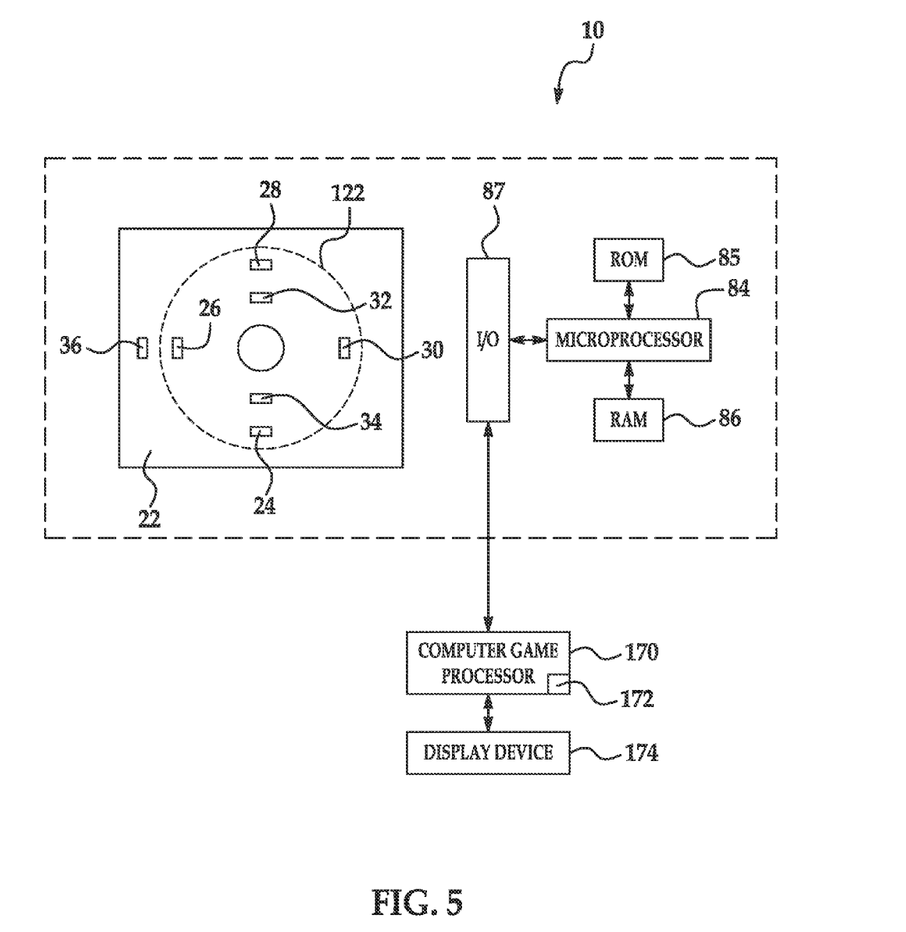
FIG. 5 is a block diagram of a system utilizing the hand-activated controller of FIG. 1, a computer game processor, and a display device.

Referring to FIGS. 4 and 5, the base 20 is provided to support other components of the hand-activated controller 10. The base 20 includes a plate portion 106 and a tubular receiving portion 108 extending upwardly from the plate portion 106. The base 20 is constructed from plastic.

The circuit board 20 is provided to support electrical components in a single plane. The circuit board 20 is a substantially flat rectangular-shaped circuit board. The electrical switches 24, 26, 28, 30, 32, 34, 36 are disposed on a top surface of the circuit board 20. The circuit board 20 has an aperture 110 extending therethrough for receiving the spring 44 and the tubular portion 124 of the shaft 42 therethrough.

In one exemplary embodiment, the electrical switches have a normally-open operational state. The electrical switches 24, 26, 28, 30, 32, 34, 36 transition from the normally open operational state to a closed operational state in response to the top portion of the switches being depressed. Further, in one exemplary embodiment, the electrical switches 24, 26, 28, 30, 32, 34, 36 are electrical microswitches. Of course in an alternative embodiment, the electrical switches have a normally-closed operational state. Further, the electrical switches transition from the normally-closed operational state to an open operational state in response to the top portion of the switches being depressed.

The switches 24, 26, 28, 30 are provided to detect when a user tilts the ball-shaped member 48 and the shaft 42 in first, second, third, and fourth directions, respectively. In particular, the plate portion 122 contacts the top portion of at least one of the switches 24, 26, 28, 30 when the ball-shaped member 48 is tilted to transition an operational state of one of the switches 24, 26, 28, 30 to another operational state. Further, the switches 28, 26, 28, 30 are provided to detect when a user depresses the ball-shaped member 48 and the shaft 40 downwardly towards the base 20. In particular, the plate portion 122 can contact the top portions of the switches 24, 26, 28, 30 if the ball-shaped member 48 is depressed downwardly to transition an operational state of the switches 24, 26, 28, 32 to another operational state.

The switches 24, 28 are provided to detect rotation of the ball-shaped member 48 and the shaft 42. The plate portion 122 has a ramp portion 123 disposed on a bottom surface thereof. When the member 48 and shaft 42 are rotated, the ramp portion 123 of the plate portion 122 contacts a top portion of at least one of the switches 24, 28 to transition an operational state of one of the switches to another operational state indicating a direction of rotation of the member 48 and the shaft 42 about a vertical axis extending through the shaft 42. It should be noted that to determine the rotational direction of the member 48 and shaft 42, an identifier associated with one of the switches 24, 28 that was previously contacted by the ramp 123 is stored in the memory device 86.

The switch 36 is provided to detect when the ball-shaped member 48 and the shaft 42 are moved upwardly along a vertical axis extending through the shaft 42. When the member 48 and the shaft 42 are moved upwardly, the plate portion 122 of the shaft 42 contacts an arm 128 of the lever 47 and rotates an arm 129 of the lever 47 about a pivot point 130.

Rotation of the arm 129 induces the arm 129 to contact a top portion of the switch 36 to transition an operational state of the switch 36 to another operational state, indicating upward movement of the member 48 and the shaft 42.

The plate 40 is disposed on the circuit board 22. The plate 40 is substantially rectangular-shaped and is constructed of plastic. The plate 40 includes apertures extending therethrough for allowing top portions of the switches 24, 26, 28, 30, 32, 34, 36 to extend therethrough.

The shaft 42 includes a tubular portion 120, a plate portion 122, and a tubular portion 124. The tubular portion 120 extends from a top surface of the plate portion 122 and is centered on the plate portion 122. The tubular portion 124 extends from a bottom surface of the plate portion 122 and is centered on the plate portion 122. In one exemplary embodiment, the plate portion 122 is a substantially circular-shaped plate. The tubular portion 124 is configured to receive an end of the spring 44 therein. The other end of the spring 44 is disposed in a tubular receiving portion 108 extending from the base 20. The spring 44 biases of the shaft 42 upwardly such that the plate portion 122 does not activate the switches 24, 26, 28, 30 unless the shaft 42 is depressed downwardly by a user.

The spring 46 is disposed on the tubular portion 120 of the shaft 42 and rests against a top surface of the plate portion 142. An opposite end of the spring 46 contacts the ball-shaped member 48 to bias the ball-shaped member 48 upwardly.

The ball-shaped member 48 is provided to allow a user to easily grasp the member 48 for controlling movement of the shaft 42. The member 48 is fixedly coupled to the shaft 42. The member 48 includes a lower portion 140 and an upper portion 142. The lower portion 140 includes an aperture extending therethrough for receiving the tubular portion 120 of the shaft 42 therethrough. The lower portion 140 is constructed of a plastic or a rubber compound. The upper portion 142 is constructed of a plastic of a rubber compound. The upper portion 142 has an interior surface defining a central interior space 144 therein. A retaining member 50 is disposed against the interior surface of the upper portion 142. The retaining member 50 is constructed of a plastic or a rubber compound that has a hardness greater than a hardness of the upper portion 142. The ball-shaped member 48 further includes a retainer portion or cap portion 52 that is disposed in an indented region on a top surface of the member 48.

The electrical contacts 60, 70 are disposed in the ball-shaped member 48 to detect when the member 48 is compressed or squeezed by a user. The electrical contact 60 is ring-shaped and is disposed against the support member 50 within the central interior space 142. The contact 70 is ring-shaped and disposed around a portion of the lower portion 142 proximate to the electrical contact 60. When the ball-shaped member 48 is compressed or squeezed, the electrical contacts 60, 70 are electrically coupled together while the member is compressed or squeezed, which is detected by the microprocessor 84.

The support member 72 is substantially tubular-shaped and is disposed around the tubular portion 120 of the shaft 42, and is disposed between the lower portion 140 and a portion of the retainer portion 50. The support member 72 is constructed from plastic.

Figure 3:
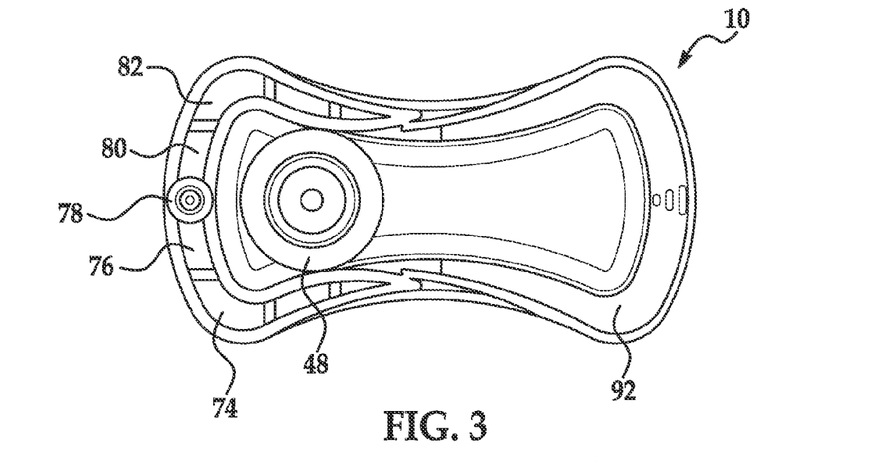
FIG. 3 is another schematic of the hand-activated controller of FIG. 1.
Figure 6:
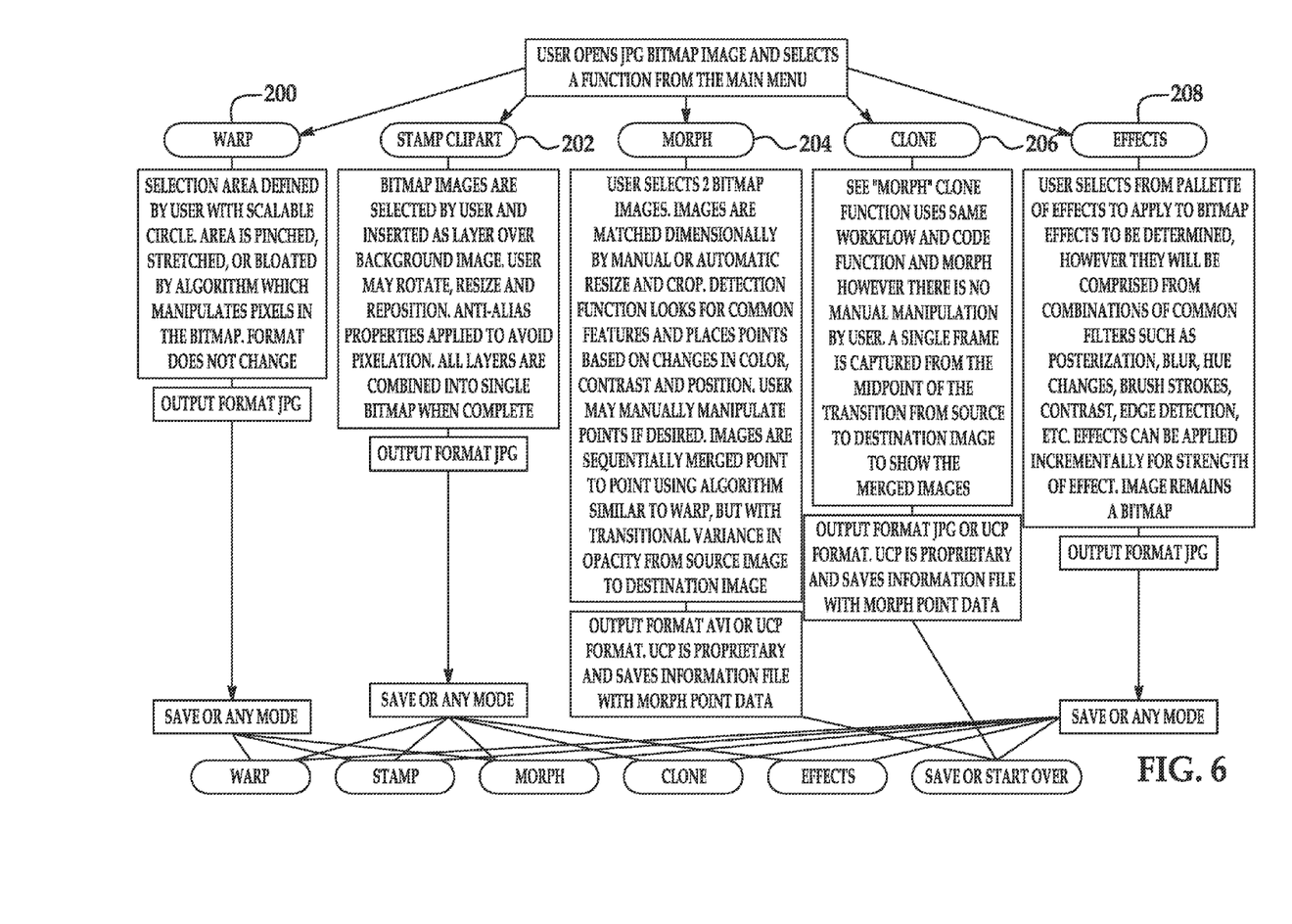
FIG. 6 is a block diagram of software functions of a computer game executing on the computer game processor of FIG. 5 and controlled by the hand-activated controller of FIG. 1.

Referring to FIGS. 3, 5 and 6, the function selection switches 74, 76, 78, 80, 82 are provided to allow user to select software functions in a computer game. In particular, the function selection switches 74, 76, 78, 80, 82 allow a user to select a least one of: (i) an image morphing software function 204, (ii) an image warping software function 200, (iii) a stamp/clip art software function 202, (iv) an image cloning software function 206, and (v) an image effects software function 208, in a computer game 172 being executed on a computer game processor 170. The function selection switches 74, 76, 78, 80, 82 are electrically coupled to the microprocessor 84 which detects an operational state of the switches. Upon activation of one of the switches 74, 76, 78, 80, 82, the microprocessor 84 instructs the computer game processor 170 to execute one of the foregoing software functions in the computer game 172.

The image warping software function 200 allows a user to select a portion of an image (e.g., a distortion region) and the selected portion is altered by pushing, pulling, twisting or smearing the selected area, utilizing the hand-activated controller 10.

The stamp/clip art software function 202 allows a user to select and place clip art on an image, utilizing the hand-activated controller 10. Once placed on the image, the clip art becomes a part of the image unless an undo button command is performed. Successive stamp placements have priority over the prior stamp placements (i.e., the last stamped image will be placed over the previous stamped images if they are in the same location on the image).

The image cloning software function 206 allows a user to merge two source images to obtain a merged image, utilizing the hand-activated controller 10. The user opens a source image utilizing the controller 10 and selects a portion of that image to use. The process is repeated for the other source image and then the two source images and the resulting "cloned" image are displayed. The user can set a mixture level of each source image to be used in the resulting image (i.e., a greater percentage of characteristics of one source image may be used over characteristics of the other image) or a fixed software algorithm can be used to perform a best mix of the two source images.

The image morphing software function 204 allows a user to morph one image into another, utilizing the hand-activated controller 10. The primary output of the function 204 is a movie. Further, the user has a high degree of control over how the images are combined. A plurality of points (e.g., 25 points) can be positioned to steer the transition. The user places points on the start image and then the software will place a corresponding point on the end image at the same image coordinates. The user can then move the point in the end image to a location that matches the desired feature in the start image. When finished, the user can then watch the morph movie and set a speed and direction that it runs.

The image effects software function 208 allows a user to apply a global effect (e.g., black/white, sepia, negative, pixelate) to a source image, utilizing the hand-activated controller 10. An input device such as the shaft 42 can be rotated to increase or decrease an intensity of the effect.

Referring again to FIG. 5, the microprocessor 84 is provided to determine whether a user has depressed the ball-shaped member 42, tilted the member 42 in one of four directions, lifted the member 42 upwardly, rotated the member 42, or squeezed in the member 42, which will be explained in greater detail below. The microprocessor 84 is electrically coupled to the ROM 85, the RAM 86, and the I/O interface 87. The I/O interface 87 is further electrically coupled to the switches 24, 26, 28, 30, 32, 34, 36 and the function selection switches 74, 76, 78, 80, 82. In one exemplary embodiment, the microprocessor 84 is disposed within the hand-activated controller 10. However, in an alternative embodiment, the microprocessor 84 is disposed external to the hand-activated controller 10 wherein the microprocessor 84 is electrically connected to the switches within the hand-activated controller 10.

In particular, the microprocessor 84 is configured to determine if the switches 24, 26, 28, 30 all transition from a first operational state to a second operational state indicating that the ball-shaped member 48 and the shaft have been pushed downwardly toward the base 20, and to transmit first signals in response thereto which is received by the microprocessor 84. In response to the first signals, the microprocessor 84 can send a command signal to the computer game processor 170 to perform a predetermined function, such as increasing or decreasing a size of a displayed image for example.

Further, the microprocessor 84 is configured to determine if only the switch 24 transitions from the first operational state to the second operational state, indicating the shaft 42 is being tilted in a first direction; and to transmit a second signal in response thereto which is received by the microprocessor 84. In response to the second signal, the microprocessor 84 can send a command signal to the computer game processor 172 to perform a predetermined function such as moving an image in a first predetermined direction for example.

Further, the microprocessor 84 is configured to determine if only the switch 26 transitions from the first operational state to the second operational state, indicating the shaft 42 is being tilted in a second direction; and to transmit a third signal in response thereto which is received by the microprocessor 84. In response to the third signal, the microprocessor 84 can send a command signal to instruct the computer game processor 172 to perform a predetermined function such as moving an image in a second predetermined direction for example.

Further, the microprocessor 84 is configured to determine if only the switch 28 transitions from the first operational state to the second operational state, indicating the shaft 42 is being tilted in a third direction; and to transmit a fourth signal in response thereto which is received by the microprocessor 84. In response to the fourth signal, the microprocessor 84 can send a command signal to instruct the computer game processor 170 to perform a predetermined function such as moving an image in a third predetermined direction for example.

Further, the microprocessor 84 is configured to determine if only the switch 30 transitions from the first operational state to the second operational state, indicating the shaft 42 is being tilted in a fourth direction; and to transmit a fifth signal in response thereto which is received by the microprocessor 84. In response to the fifth signal, the microprocessor 84 can send a command signal to instruct the computer game processor 170 to perform a predetermined function such as moving an image in another predetermined direction for example.

Further, the microprocessor 84 is configured to determine if at least one of the switches 32, 34 transition from the first operational state to the second operational state indicating that the ball-shaped member 48 and the shaft 42 have been rotated, and to generate a command signal in response thereto that is received by the computer game processor 170.

Further, the microprocessor 84 is configured to determine if the switch 36 transitions from the first operational state to the second operational state indicating that the ball-shaped member 48 and the shaft 42 have moved upwardly relative to the circuit board 22, and to generate a command signal in response thereto that is received by the computer game processor 170.

Further, the microprocessor 84 is configured to determine if the electrical contacts 60, 70 are electrically coupled together indicating the ball-shaped member 48 has been compressed, and to generate a second command signal in response thereto that is received by the computer game processor 170.

The computer game processor 170 is electrically coupled to a display device 174. The processor 170 is configured to execute the computer game 172 thereon. The processor 170 is further configured to induce the display device 174 to display images generated by the computer game 172. In one exemplary embodiment, the processor 170 comprises a microprocessor or a central processing unit with a memory (not shown) that stores the computer game 172 having executable software instructions. Further, in an alternative embodiment, the microprocessor 84 can be a part of the computer game processor 170 and is disposed external of the hand-activated controller 10.

Figure 1:
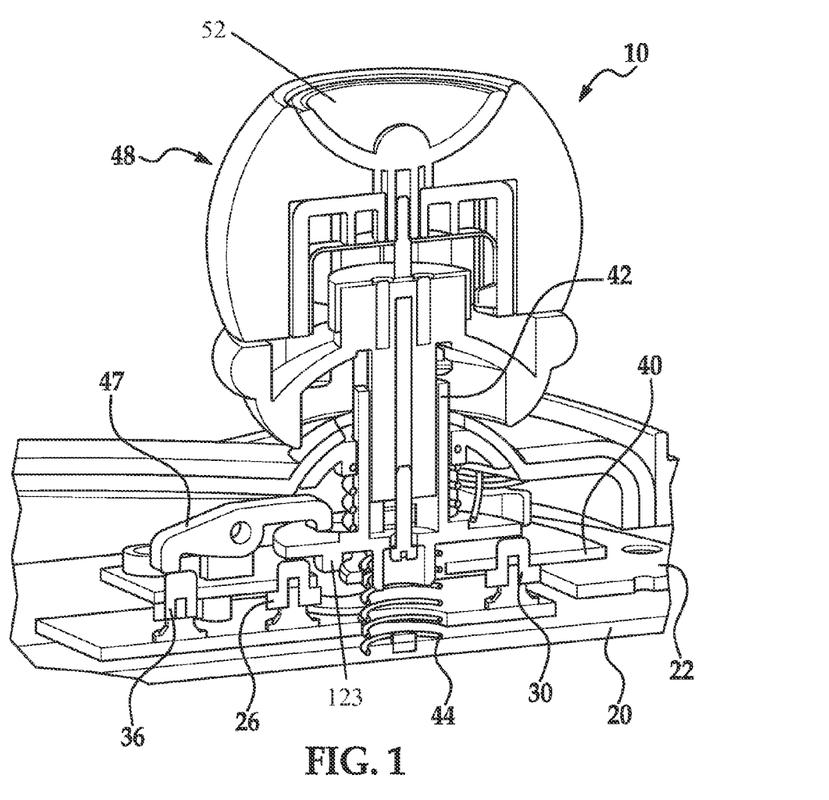
FIG. 1 is a cross-sectional schematic of a hand-activated controller in accordance with an exemplary embodiment.
Figure 2:
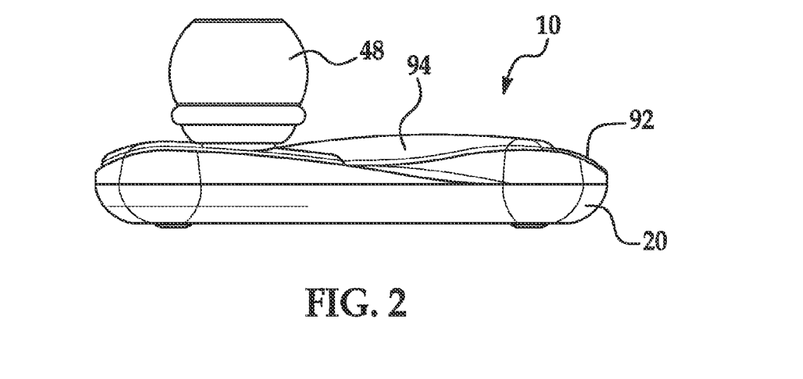
FIG. 2 is another schematic of the hand-activated controller of FIG. 1.

Referring to FIGS. 2 and 3, the upper housing portion 92 is configured to be coupled to the base 20. The upper housing portion 92 is constructed of plastic. Further, the upper housing portion has apertures therein to allow the shaft 42 and the function selection buttons 74, 76, 78, 80, 82 to extend at least partially therethrough.

The pad 94 is attached to the upper housing portion 92 and is shaped to receive a human palm thereon. The pad 94 is constructed from a plastic or a rubber compound.

While the present invention has been described in terms of specific embodiments, it should be appreciated that the spirit and scope of the invention is not limited to those embodiments. The features, functions, elements and/or properties, and/or combination and combinations of features, functions, elements and/or properties of the track set may be claimed in this or a related application. All subject matter that comes within the meaning and range of equivalency of the claims is to be embraced within the scope of such claims.

What is claimed is:

1. A hand-activated controller, comprising:
a base;
a circuit board attached to the base, the circuit board further having an aperture extending therethrough;
first, second, third, and fourth switches disposed on the circuit board and arranged around the periphery of the aperture;
a shaft having a first tubular portion, a second tubular portion and a plate portion secured to the shaft and located between the first tubular portion and the second tubular portion, the plate portion being located above the first, second, third and fourth switches;
a spring being disposed between the plate portion and the base, the spring extending through the aperture of the circuit board and being received by the second tubular portion;
a ball-shaped member being coupled to the first tubular portion of the shaft;
a microprocessor electrically coupled to the first, second, third and fourth switches;
the microprocessor configured to determine when the first, second, third and fourth switches transition from a first operational state to a second operational state indicating that the ball-shaped member and the shaft have been pushed downwardly toward the base, and to generate a first command signal in response thereto;
fifth and sixth switches disposed on the circuit board, the plate portion of the shaft having a ramp portion that contacts at least one of the fifth and sixth switches when the ball-shaped member and the shaft are rotated about a vertical axis extending through the shaft to transition at least one of the fifth and sixth switches from the first operational state to the second operational state; and
the microprocessor further configured to determine when at least one of the fifth and sixth switches transition from the first operational state to the second operational state indicating that the ball-shaped member and the shaft have been rotated, and to generate a second command signal in response thereto.

2. The hand-activated controller of claim 1, wherein the microprocessor is further configured to determine when only the first switch transitions from the first operational state to the second operational state, indicating the shaft is being tilted in a first direction; and to generate another command signal in response thereto.

3. The hand-activated controller of claim 2, wherein the microprocessor is further configured to determine when only the second switch transitions from the first operational state to the second operational state, indicating the shaft is being tilted in a second direction; and to generate a third command signal in response thereto.

4. The hand-activated controller of claim 3, wherein the microprocessor is further configured to determine when only the third switch transitions from the first operational state to the second operational state, indicating the shaft is being tilted in a third direction; and to generate a fourth command signal in response thereto.

5. The hand-activated controller of claim 4, wherein the microprocessor is further configured to determine when only the fourth switch transitions from the first operational state to the second operational state, indicating the shaft is being tilted in a fourth direction; and to generate a fifth command signal in response thereto.

6. The hand-activated controller of claim 1, further comprising:
   a seventh switch disposed on the circuit board;
   a lever pivotally coupled between an upper surface of the plate portion of the shaft and the seventh switch, such that when the shaft is moved upwardly, the lever contacts the seventh switch and transitions the seventh switch from the first operational state to the second operational state; and
   the microprocessor further configured to determine when the seventh switch transitions from the first operational state to the second operational state indicating that the ball-shaped member and the shaft have moved upwardly relative to the circuit board, and to generate another command signal in response thereto.

7. The hand-activated controller of claim 6, wherein the base further comprises a tubular receiving portion that extends upward from the base.

8. The hand-activated controller of claim 7, wherein the tubular receiving portion extends through the aperture of the circuit board and the spring is received within the tubular receiving portion and the second tubular portion.

9. The hand-activated controller of claim 1, wherein the ball-shaped member includes a lower portion and an upper portion, the lower portion being coupled to the first tubular portion of the shaft, the upper portion having an interior surface defining a central interior space, the upper portion having a first electrical contact disposed proximate to the interior surface, the lower portion having a second electrical contact disposed in the central interior space proximate to the first electrical contact, such that when the upper portion is compressed the first and second electrical contacts are electrically coupled together; and
   the microprocessor further configured to determine when the first and second electrical contacts are electrically coupled together indicating the ball-shaped member has been compressed, and to generate another command signal in response thereto.

10. The hand-activated controller of claim 1, wherein the ball-shaped member includes a cap portion on a top surface of the ball-shaped member.

11. The hand-activated controller of claim 1, further comprising an upper housing portion coupled to the base, the upper housing portion having another aperture extending therethrough for receiving the shaft therethrough.

12. The hand-activated controller of claim 11, further comprising:
   at least one function selection switch coupled to upper housing portion, the function selection switch being electrically coupled to the processor; and
   the microprocessor configured to detect when the function selection switch transitions from the first operational state to the second operational state, to select at least one of: an image morphing software function, an image warping software function, a clip art software function, an image cloning software function, and an image effects software function.

13. The hand-activated controller of claim 11, further comprising a pad that is shaped to receive a human palm thereon, the pad being coupled to the upper housing portion.

14. The hand-activated controller of claim 1, wherein the base further comprises a tubular receiving portion that extends upward from the base.

15. The hand-activated controller of claim 14, wherein the tubular receiving portion extends through the aperture of the circuit board and the spring is received within the tubular receiving portion and the second tubular portion.

16. The hand-activated controller of claim 15, wherein the ball-shaped member includes a lower portion and an upper portion, the lower portion being coupled to the first tubular portion of the shaft, the upper portion having an interior surface defining a central interior space, the upper portion having a first electrical contact disposed proximate to the interior surface, the lower portion having a second electrical contact disposed in the central interior space proximate to the first electrical contact, such that when the upper portion is compressed the first and second electrical contacts are electrically coupled together; and
   the microprocessor further configured to determine when the first and second electrical contacts are electrically coupled together indicating the ball-shaped member has been compressed, and to generate another command signal in response thereto.

17. The hand-activated controller of claim 1, wherein the base further comprises a tubular receiving portion that extends upward from the base.

18. The hand-activated controller of claim 17, wherein the tubular receiving portion extends through the aperture of the circuit board and the spring is received within the tubular receiving portion and the second tubular portion.

19. The hand-activated controller of claim 1, wherein the shaft and the plate member are configured for movement between a first position wherein the plate member does not contact anyone of the first, second, third and fourth switches and a second position wherein the plate member contacts at least one of the first, second, third and fourth switches.

* * * * *